ional application No. 60/001,341, Jul. 24, 1995.

United States Patent [19]
Havriliak, Jr. et al.

[11] Patent Number: 5,654,365
[45] Date of Patent: Aug. 5, 1997

[54] STYRENIC POLYMER COMPOSITION

[75] Inventors: Stephen Havriliak, Jr., Huntingdon Valley; Nazir Ahmed Memon, Yardley, both of Pa.; Choung-Houng Lai, Hsin-Chu Hsien, Taiwan

[73] Assignee: Rohm and Haas Company, Philadelphia, Pa.

[21] Appl. No.: 678,259

[22] Filed: Jul. 11, 1996

Related U.S. Application Data

[60] Provisional application No. 60/001,341, Jul. 24, 1995.

[51] Int. Cl.⁶ ............................ C08L 25/06; C08L 25/10
[52] U.S. Cl. ........................ 525/98; 525/70; 525/71
[58] Field of Search ........................... 525/98, 70, 71

[56] References Cited

U.S. PATENT DOCUMENTS

| | | | |
|---|---|---|---|
| 3,907,930 | 9/1975 | O'Grady | 525/98 |
| 4,073,831 | 2/1978 | Tabana et al. | 260/876 |
| 5,391,603 | 2/1995 | Wessel et al. | 524/396 |
| 5,391,611 | 2/1995 | Funayama et al. | 524/508 |
| 5,395,890 | 3/1995 | Nakano et al. | 525/165 |
| 5,543,462 | 8/1996 | Okada et al. | 525/74 |

FOREIGN PATENT DOCUMENTS

| | | |
|---|---|---|
| 0048389 | 3/1982 | European Pat. Off. . |
| 265142 A | 10/1987 | European Pat. Off. . |
| 302509 A | 5/1988 | European Pat. Off. . |
| 2510070 | 9/1975 | Germany . |
| 0129038 | 8/1983 | Japan . |
| WO94/24206 | 4/1993 | WIPO . |

Primary Examiner—Irina S. Zemel
Attorney, Agent, or Firm—Darryl P. Frickey; Roger K. Graham

[57] ABSTRACT

Syndiotactic polystyrene can be impact-modified by a blend of (a) polystyrene-hydrogenated polybutadiene block copolymers and (b) one or more core/shell modifiers based on a lightly or non-crosslinked rubber core, and with at least one shell or intermediate shell stage which is predominantly polystyrene, to produce a material of higher impact strength than the better value of either additive singly at the same total impact modifier level.

5 Claims, No Drawings

STYRENIC POLYMER COMPOSITION

This is a nonprovisional application of prior pending provisional application Ser. No. 60/001,341, filed Jul. 24, 1995.

Attention relates to an impact modified syndiotactic polystyrene, and further to an impact modified syndiotactic polystyrene prepared by blending syndiotactic polystyrene with (a) a polystyrene-hydrogenated polybutadiene block copolymer and (b) a core/shell modifier based on a lightly or non-crosslinked rubber core, to produce a material of higher impact strength than the better of either additive singly at the same total impact modifier level.

Syndiotactic polystyrene (SPS) is a late-comer to the world of commercial plastics. As described in several patent application, SPS is a polymer derived from styrene monomer by use of selected organometallic catalysts, which polymer has a syndiotactic, as opposed to atactic or isotactic structure. The resulting polymer is crystalline and has a higher softening point than either atactic or isotactic structure, making it useful for many articles of commerce now formed from more expensive resins. As noted in Stanford Research Institute (SRI) PEP report #39C (1994), SPS resin (unmodified) has properties including a tensile strength @ break of 35–132 mPa, and elongation of 1–20% at break. The crystallinity after melt processing is about 50%, making SPS a semi-crystalline engineering thermoplastic with a melting point of 270° C. The unmodified polymer tends to be brittle, but can be formulated with impact modifier, etc., to give a product with good toughness and electrical properties. Glass fiber reinforced SPS reportedly has the highest Izod impact strength other than polycarbonate. The markets are viewed as: packaging, films, fibers, and other extruded or thermoformed products, where a toughened version would have desired properties.

As recognized in European Unexamined Patent Application 318,793, now also U.S. Pat. No. 5,395,890, SPS is still a relatively brittle polymer unless it is impact-modified. A variety of impact modifiers, such as styrene-butadiene block copolymers, polystyrene-hydrogenated hydrogenated polybutadiene block copolymers, polybutadiene/polystyrene staged polymers, certain core/shell copolymers (multi-stage polymers), and other "rubbery" copolymers are taught singly, and sometimes in combination, as being impact modifiers for SPS. However, there is no teaching or suggestion in '793 (or in two other recent patents related to impact modification of SPS, viz., U.S. Pat. Nos. 5,391,603 and 5,391,611) that improved impact strength can be achieved by a combination of impact modifiers chosen from their Groups (I) and (II)

There is a need for a tougher impact-modified version of SPS (or for one which will achieve equivalent toughness at lower impact modifier loading), so as better to compete with toughened engineering resins on a cost/performance basis. As taught in the '793 application, there appears to be an upper limit of impact modification which can be obtained by the use of any single impact modifier taught therein, and further there is no teaching or suggestion of a combination of impact modifiers which will produce synergism, i.e., enhanced toughness over an equivalent amount of either of the single modifiers.

A specific core/shell modifier for atactic polystyrene, especially one already containing a butadiene rubber such as in commercial high-impact polystyrene, is taught in European Unexamined Application 265,142. However, this application does not teach or suggest combination with the block copolymers disclosed in the present invention, and especially not for use in syndiotactic polystyrene (which, being crystalline, as opposed to amorphous conventional polystyrene, and softening and processing at a higher temperature, would not necessarily be modified for impact resistance in the same manner as conventional polystyrene).

It is therefore an object of our invention to obtain an impact-modified SPS with unexpectedly superior impact strength over any impact modifiers or combination of impact modifiers taught by the prior art. It is a further object to obtain an impact-modified SPS with superior impact strength efficiency (that is, attainment of an equivalent impact value at a lower use level of impact modifier) over any impact modifiers or combination of impact modifiers taught by the prior art. It is a further object to attain these impact properties without significant detraction from any of the physical or chemical properties of impact-modified SPS known to the prior art. It is a further object to obtain injection-molded or extruded articles of commerce from these new toughened SPS polymer blends.

Thus, we have discovered an improved impact-modified syndiotactic polystyrene containing at least two impact modifiers, the admixture comprising:
(a) from 65 to 95 parts of SPS per 100 parts of admixture;
(b) from 5 to 35 parts of a blend of at least two impact modifiers, the blend comprising
 (i) from 10 parts to 90 parts of at least one block copolymer of at least one block of polystyrene and at least one block of hydrogenated polybutadiene;
 (ii) from 90 parts to 10 parts of at least one core/shell polymer having a core of a butadiene homopolymer or co-polymer with up to 25 weight % of at least one styrenic, (meth)acrylonitrile, or (meth)acrylic ester co-monomer, the core being at least 70 weight % of the total of all stages, and the first shell or second shell being a styrenic homo- or copolymer with up to 25 weight % of a (meth)acrylonitrile or (meth)acrylic ester co-monomer;
wherein the impact strength of the improved blend is greater than the impact strength of syndiotactic polystyrene modified at the same impact modifier level, but with (i) as the sole impact modifier, and also greater than the impact strength of syndiotactic polystyrene modified at the same impact modifier level, but with (ii) as the sole impact modifier.

A preferred embodiment of the impact-modified syndiotactic polystyrene is found when the block copolymer is a triblock copolymer containing from 25 to 35 weight percent of styrene. Such block copolymers are well-known to the art and commercially available. They are prepared by sequential anionic polymerization of butadiene and styrene, and then hydrogenated substantially to saturate the remaining double bonds.

One improved embodiment of the impact-modified syndiotactic polystyrene is found when the core/shell polymer has a core of a butadiene homopolymer, the butadiene polymer being prepared in the absence of polyunsaturated monomers other than butadiene and preferably in the presence of an alkyl mercaptan, the core being pat least 60 weight % of the total of all stages, and the first shell being preferably a styrenic homopolymer. It is further preferred that the butadiene polymer has a swell ratio of above 20.

An alternative to the lightly-crosslinked high-swell modifier is a core/shell polymer having one or more shells of hard polymer surrounding a rubbery core. These core/shell polymers (often referred to as multi-stage polymers) have a core of a butadiene homopolymer or co-polymer with up to 25 weight % of at least one styrenic, (meth)acrylonitrile, or (meth)acrylic ester co-monomer, the core (first stage) being at least 70 weight % of the total of all stages, and the first shell or second shell (second or third stages) being a styrenic homo- or copolymer with up to 25 weight % of a (meth) acrylonitrile or (meth)acrylic ester co-monomer and wherein the first or second shell which is not a styrenic homo- or copolymer is a homo- or copolymer of methyl methacrylate. Such impact modifiers are known to the PVC compounding art as effective modifiers for clear PVC bottles, but their combination with the afore-mentioned block copolymers is not taught or suggested by the PVC art.

For both types of core/shell modifiers, the core or rubber level is preferably from 60 to 90 weight percent. For best impact efficiency, the core is of high butadiene content, such as 70 to 100% butadiene, with the remaining monomers preferably being styrene or other vinyl aromatic monomers, or a $C_1$–$C_8$ alkyl (meth)acrylate, such as butyl acrylate, methyl methacrylate, or ethyl acrylate. It is preferable that the level of cross-linking monomer in the rubbery core polymer be low (below 0.5%) or absent. A low level of an higher alkyl ($C_8$–$C_{12}$) mercaptan may be present in the rubber preparation.

Appropriate first shell or intermediate shell stages are polystyrene, poly(methyl methacrylate), poly(methyl methacrylate/ethyl acrylate )copolymers, or copolymers of methyl methacrylate with styrene. Appropriate second shell or final shell stages are polystyrene, poly(methyl methacrylate), poly(methyl methacrylate/ethyl acrylate) copolymers, or copolymers of methyl methacrylate with styrene.

These core/shell polymers are generally prepared in emulsion and isolated by spray-drying, salt coagulation, or acid coagulation. As noted, many of these core/shell polymers are available commercially as powders or pellets.

Usually, the core/shell modifiers based on a rubbery polymer of butadiene contain some antioxidant combination to stabilize them against degradation during the drying processes or in subsequent processing with SPS. Such antioxidants include, but are not limited to, hindered phenols, such as molecules containing a benzene ring with two branched alkyl groups, such as t-butyl groups, flanking the phenolic group. Other antioxidants, which may be used singly or in combination, and which may further be added to the blend of SPS and the two impact modifiers, include organic sulfides and disulfides, and organophosphite compounds.

Blending with the SPS of the two impact modifiers may be accomplished in a variety of ways known to the artisan in blending plastics. Because of the high crystalline melting point of the polystyrene, higher temperatures than used for atactic polystyrene are required to achieve good mixing. Overheating may lead to degradation of impact modifiers and/or the SPS. Further anti-oxidants of the types noted above may be added during processing or fabrication.

The blends of SPS and impact modifiers may be prepared separately, such as in a single- or twin-screw extruder, or a Banbury mixer, and then preferably extruded into pellets suitable for molding or re-extrusion. Processing either of the blends formed in a direct mixing operation or in an intermediate pelletization step may be done by means known to the art, again accounting for the unusual nature of the SPS as a crystalline polymer which when melted has a substantially higher melt viscosity than most crystalline polymers. Such equipment may include injection molding machines, extruders with appropriate dies for forming into sheet or profile, or extruders or injection molding machines with appropriate apparatus for adding blowing agents for forming into foamed articles such as sheets or bottles.

The blends may further contain conventional polymeric additives, such as pigments, dyes, or antioxidants. Inert or reactive fillers may be present, both to act as reinforcing agents, such as the use of glass fibers, or to act as nucleating agents, such as talc. Other nucleators, such as those taught in U.S. Pat. No. 5,391,603, especially aluminum salts of benzoic and alkyl-substituted benzoic acid, may also be present. The blends may further be combined with poly (phenylene ether) or a chemically modified poly(phenylene ether).

Although the core/shell polymers taught and claimed herein are based on a rubbery core formed from butadiene or butadiene copolymers, core/shell polymers containing an acrylate rubber core and at least one shell predominantly formed from a vinyl aromatic monomer may also be useful in achieving a balance of cost and impact performance when combined with SPS and a styrene-butadiene block copolymer. Such impact modifiers, for example, could be a core of a polymer formed predominantly from one or more $C_2$–$C_8$ alkyl acrylates, such as butyl acrylate or 2-ethylhexyl acrylate, optionally with one or more polyunsaturated monomers, and with at least one shell formed predominantly from polystyrene.

Such impact-modified syndiotactic polystyrene resins, especially reinforced with glass fibers, have attractive properties as replacement for higher-priced engineering resins, as the SPS offers inherent moisture barrier, dimensional stability, and heat distortion temperature for a variety of uses. They may be compounded and fabricated by conventional techniques such as injection molding, extrusion, blown film, and calendering, for use in electrical equipment, equipment housing, toys, appliances, automotive parts, and certain construction materials.

EXAMPLES

Starting Materials:

The syndiotactic polystyrene (SPS) is an experimental sample obtained from Idemitsu Chemical Corporation in Japan. It is believed to have a molecular weight of ca. 370,000. It is supplied as pellets.

The hydrogenated block copolymer of styrene/butadiene is Kraton 1651, supplied by Shell Chemical, and described by the supplier as a triblock block copolymer with high molecular weight segments, with a styrene/rubber ratio of 32/68. It is a coarse powder.

The core/shell polymer of many of the examples is that of Example 1 of European Patent Application 265,142. It is in the form of a spray-dried powder. The preparation is detailed in Example 10. In the descriptions of the core/shell modifiers, a single slash indicates a copolymer composition of that stage, whereas a double slash indicates a separate stage has been formed by sequential polymerization.

An antioxidant is added at the 1% level based on the total modifier level.

It is tetrakis(methylene (3,5-di-t-butyl-4-hydroxyhydrocinnamate) methane).

Blending: The SPS pellets are weighed, dried overnight, and then added to a pre-weighed blend of the block copolymer, core-shell polymer, and antioxidant, and hand-mixed thoroughly. The blend is then fed to an American Leistritz intermeshing twin-screw contra-rotating extruder of screw diameter 28 mm., operating at 120 rpm, hopper zone 266° C., melt zones 275° C. and 275° C., die zone 275° C. The die is a strand die and the strands are cooled first in air and then in water, prior to chopping to pellets for injection molding.

In some experiments, compounding is done on a single-screw 109 mm. Killion extruder at similar temperature settings. The results show a similar trend as did samples compounded on the twin-screw extruder, but are lower in absolute value.

Injection Molding: The pellets are fed to a Newbury injection molder equipped with a ASTM "cluster" mold. The mold temperature is 142° C., hopper zone 282° C., melt zones 277° C. and 271° C., and the nozzle is set at 277° C. The cycle is 40 seconds total, injection time 25 seconds, and hold time 15 seconds.

Testing: Notched Izod bars of ⅛ inch (3.175 mm) are tested at 23° C. by a standard ASTM test method.

Examples 1–3

These Examples illustrate in Table I the effect of varying the amounts of the hydrogenated butadiene-styrene block copolymer (HBSBCP) and of the lightly cross-linked core/shell modifier (LCLCSM) on the impact strength of SPS. These blends contain a total of 20% or 30% of the hydrogenated butadiene-styrene block copolymer and/or the lightly cross-linked core/shell modifier; the separate percentages are noted. Processing is noted as single-screw (SS) or twin-screw (TS) extruder. The synergistic effect of the blend or combination of impact modifiers is clearly seen.

TABLE I

| Example | % LCLCSM | % HBSBCP | Extruder | Izod, J/m |
|---|---|---|---|---|
| 1-A | 0 | 20 | SS | 101 |
| 1-B | 10 | 10 | SS | 133 |
| 1-C | 20 | 0 | SS | 64 |
| 2-A | 0 | 20 | TS | 133 |
| 2-B | 10 | 10 | TS | 165 |
| 2-C | 20 | 0 | TS | 91 |
| 3-A | 0 | 30 | SS | 165 |
| 3-B | 15 | 15 | SS | 267 |
| 3-C | 30 | 0 | SS | 91 |

The toughened blends may be molded into useful toughened objects, such as containers and toys.

Example 4

This Example again clearly shows the synergistic effect of the blend of impact modifiers. Abbreviations and samples are as in Examples 1–3. The reason for the overall improvement in values over those shown in Example 2 is unknown, but the trends remain, i.e., a synergistic improvement at percentages of the lightly-crosslinked core/shell modifier (LCLCSM) from 4% to 16% (i.e., from 20% to 80% of the total impact modifier blend).

TABLE II

| Example | % LCLCSM | % HBSBCP | Extruder | Izod, J/m |
|---|---|---|---|---|
| 4-A | 0 | 20 | TS | 160 |
| 4-B | 4 | 16 | TS | 230 |
| 4-C | 8 | 12 | TS | 219 |
| 4-D | 12 | 8 | TS | 262 |
| 4-E | 16 | 4 | TS | 230 |
| 4-F | 20 | 0 | TS | 91 |

Example 5

In this Example, the LCLCSM employed in the earlier examples is replaced by a spray-dried core/shell impact modifier (CSM) with a three-stage structure of butadiene/styrene/divinylbenzene (94/5/1)//styrene//methyl methacrylate/butylene glycol dimethacrylate (99/1), as taught in U.S. Pat. No. 3,985,704. The ratio of stages is 77.5/10/12.5. In the testing, no hinged or ductile breaks are observed, but the synergistic effect is seen at percentages of the core/shell modifier (CSM) from 2% to 12% (i.e., from 10% to 60% of the total impact modifier blend).

TABLE III

| Example | % CSM | % HSBBCP | Extruder | Izod, J/m |
|---|---|---|---|---|
| 5-A | 0 | 20 | TS | 146 |
| 5-B | 2 | 18 | TS | 165 |
| 5-C | 4 | 16 | TS | 184 |
| 5-D | 8 | 12 | TS | 168 |
| 5-E | 12 | 8 | TS | 154 |
| 5-F | 16 | 4 | TS | 66.7 |
| 5-G | 18 | 2 | TS | 56.6 |
| 5-H | 20 | 0 | TS | 21 |

Examples 6–9

In these Examples, several core/shell modifiers of varying compositions are utilized. Testing is similar to the earlier Examples, and is conducted at room temperature at 0, 10, and 20 parts of core/shell modifier, the total impact modifier content being held at 20%. Again, no hinged breaks are seen. In two cases, true synergism is seen at the 1:1 mixture of impact modifiers. In Example 8, the value is above that expected on an averaging basis, but is not as high as the HSBBCP control.

TABLE IV

| | | | | | | |
|---|---|---|---|---|---|---|
| Bd = butadiene; MMA = methyl methacrylate; St = styrene; EA = ethyl acrylate; DVB = divinylbenzene | | | | | | |
| Example | % CSM | Core (first stage) CSM | First shell (second stage) CSM | Second shell (third stage) CSM | % HSBBCP | Izod, J/m |
| control (for all series) | 0 | | | | 20 | 169 |
| 6-A | 20 | Bd/Sty = 60/20 | MMA = 10 | St = 10 | 0 | 25 |
| 6-B | 10 | | | | 10 | 196 |
| 7-A | 20 | Bd/Sty/DVB = 61/14/0.15 | MMA/EA = 10/2.5 | St/DVB = 12.5/0.02 | 0 | 24.5 |
| 7-B | 10 | | | | 10 | 218 |

TABLE IV-continued

Bd = butadiene; MMA = methyl methacrylate; St = styrene; EA = ethyl acrylate; DVB = divinylbenzene

| Example | % CSM | Core (first stage) CSM | First shell (second stage) CSM | Second shell (third stage) CSM | % HSBBCP | Izod, J/m |
|---|---|---|---|---|---|---|
| 7-C | 0 (repeat of control) | | | | 20 | 157; 160 |
| 7-D | 2 | | | | 18 | 237 |
| 7-E | 4 | | | | 16 | 213 |
| 7-F | 8 | | | | 12 | 200 |
| 7-G | 12 | | | | 8 | 180 |
| 7-H | 16 | | | | 4 | 137 |
| 7-H | 18 | | | | 2 | 68.3 |
| 7-J | 20 (repeat of 7B) | | | | 0 | 19.2 |
| 8-A | 20 | Bd/Sty/MMA = 60/19/1 | MMA = 10 | St = 10 | 0 | 80 |
| 8-B | 10 | | | | 10 | 146 |

Example 9

A core/shell modifier containing a functionalized outer shell of a styrenic 75/hydroxyethyl methacrylate 25 copolymer on a butadiene/styrene core is ineffective in improving the impact strength when blended with the block copolymer.

Example 10

The preparation of the core/shell modifier used in Example 1 is shown in this example; in this three-step procedure the rubbery core polymer is formed as a latex (Step A) the particle size of the latex is increased by controlled destabilization or agglomeration (Step B), and an outer shell is grafted onto the agglomerated core polymer (Step C).

STEP A

The following is charged to a stainless steel reactor:

| Butadiene | 75 parts |
| Styrene | 25 parts |
| Potassium Oleate | 5 parts |
| n-Dodecyl Mercaptan | 0.5 parts |
| Potassium Persulfate | 0.3 parts |
| Deionized Water | 180 parts |

The reactor is heated with stirring to 50° C. and held at that temperature for 24 hours. The final conversion to polymer is at least 95%.

STEP B

The following is charged to a glass flask:

| Rubber Latex of Step A | 100 parts |
| Water | 140 parts |

The flask contents are stirred and adjusted to pH 4.5 with acetic acid (approximately 2 parts), then to pH 10 with sodium hydroxide (approximately 5 parts).

STEP C

A glass flask is charged with 80 parts of the wet, agglomerated rubber latex of Step B. The flask contents are heated to, and maintained at, 50° C. with stirring, and the following are charged to the flask:

| Styrene | 20 parts |
| Sodium Formaldehyde Sulfoxylate | 0.06 parts |
| (Ethylenedinitrilo) tetraacetic acid, disodium salt | 0.006 parts |
| Ferrous Sulfate | 0.0012 parts |
| Water | 510 parts |

To the resulting mixture 0.063 parts of tert-butyl hydroperoxide is added over a period of two hours. The final conversion to polymer is at least 99%, and the final emulsion particle size is 190 nanometers (nm), as measured by Nanosizer. The resulting modifier polymer is stabilized with ca. 1%, 2,6-di-tert-butyl-4-methylphenol, and is isolated by salt coagulation. The dried modifier has a toluene swell index of 19. The modifier had the following overall composition:

Bd/Sty

60/40

Toluene swell index is determined using a small sample of dried modifier, typically 0.15–0.25 g, weighted into a glass vial and covered with a bout 45 ml of commercial-grade toluene. The sample is allowed to stand covered for three days at room temperature to allow full equilibration, and the swollen sample is then quickly filtered from the toluene and weighed. The wet sample is then carefully dried in a vacuum oven at 80° C. and reweighed. The swell index is calculated by dividing the weight of the swollen sample by that of the dried sample.

Emulsion particle sizes is measured by use of a Nanosizer instrument manufactured by Coulter Electronics. This instrument estimates the average size of emulsion polymer particles by following the light scattered by the Brownian motion of the emulsion.

We claim:

1. An impact-modified syndiotactic polystyrene (SPS) admixture containing at least two impact modifiers, the admixture comprising:

(a) from 65 to 95 parts of SPS per 100 parts of the admixture;

(b) from 5 to 35 parts of a blend of at least two impact modifiers, the blend comprising (i) from 10 parts to 90 parts of at least one block copolymer of at least one block of polystyrene and at least one block of hydrogenated polybutadiene;

(ii) from 90 parts to 10 parts of at least one core/shell polymer prepared in emulsion and having a core of a butadiene homopolymer or co-polymer with up to 25 weight % of at least one styrenic, (meth) acrylonitrile, or (meth)acrylic ester co-monomer, the core being at least 60 weight % of the total of all stages, and having one or two shells, the first shell or second shell being a styrenic homo- or copolymer with up to 25 weight % of a (meth)acrylonitrile or (meth)acrylic ester co-monomer; wherein the impact strength of the admixture is greater than the impact strength of a syndiotactic polystyrene admixture modified at the same impact modifier level, but with at least one block copolymer of at least one block of polystyrene and at least one block of hydrogenated polybutadiene as the sole impact modifier, and also greater than the impact strength of syndiotactic polystyrene modified at the same impact modifier level, but with at least one core/shell polymer having a core of a butadiene homopolymer or co-polymer with up to 25 weight % of at least one styrenic, (meth) acrylonitrile, or (meth)acrylic ester co-monomer, the core being at least 70 weight % of the total of all stages, and having one or two shells, the first shell or second shell being a styrenic homo- or copolymer with up to 25 weight % of a (meth)acrylonitrile or (meth)acrylic ester co-monomer as the sole impact modifier.

2. The impact-modified syndiotactic polystyrene admixture of claim 1, wherein the block copolymer is a triblock copolymer containing from 25 to 35 weight percent of styrene.

3. The impact-modified syndiotactic polystyrene admixture of claim 1, wherein the core/shell polymer contains a core of a butadiene homopolymer, the butadiene homopolymer being prepared in the substantial absence of polyunsaturated monomers other than butadiene and in the presence of an alkyl mercaptan, and with a single shell, the single shell being a styrenic homopolymer.

4. The impact-modified syndiotactic polystyrene admixture of claim 3, wherein the butadiene polymer has a swell ratio of above 20.

5. The impact-modified syndiotactic polystyrene admixture of claim 1, wherein the first or second shell which is not a styrenic homo- or copolymer is a homo- or copolymer of methyl methacrylate.

* * * * *